United States Patent [19]

Kaun

[11] Patent Number: 5,534,367
[45] Date of Patent: Jul. 9, 1996

[54] MOLTEN SALT ELECTROLYTE SEPARATOR

[75] Inventor: Thomas D. Kaun, New Lenox, Ill.

[73] Assignee: University of Chicago, Chicago, Ill.

[21] Appl. No.: 173,990

[22] Filed: Dec. 28, 1993

[51] Int. Cl.⁶ .............................. H01M 4/36; H01M 4/48
[52] U.S. Cl. ........................... 429/103; 429/101; 429/102
[58] Field of Search .................................. 429/103, 102, 429/101

[56] References Cited

U.S. PATENT DOCUMENTS

| | | | |
|---|---|---|---|
| 4,076,905 | 2/1978 | Sammells | 429/112 |
| 4,275,129 | 6/1981 | Kappus et al. | 429/112 |
| 4,317,865 | 3/1982 | Trocciola et al. | 429/41 |
| 4,851,306 | 7/1989 | Kaun et al. | 429/112 |
| 5,035,963 | 7/1991 | Plichta et al. | 429/103 |
| 5,389,464 | 2/1995 | Specht | 429/152 |

FOREIGN PATENT DOCUMENTS 2924992  1/1987  Germany.

*Primary Examiner*—George Fourson
*Assistant Examiner*—C. Everhart
*Attorney, Agent, or Firm*—Reinhart, Boerner, Van Deuren, Norris & Rieselbach

[57] ABSTRACT

A molten salt electrolyte/separator for battery and related electrochemical systems including a molten electrolyte composition and an electrically insulating solid salt dispersed therein, to provide improved performance at higher current densities and alternate designs through ease of fabrication.

15 Claims, 3 Drawing Sheets

CYCLIC VOLTAMOGRAM OF FeS$_2$ ELECTRODE

CYCLIC VOLTAMOGRAM OF FeS$_2$ ELECTRODE

MOLTEN SALT ELECTROLYTE SEPARATOR

CONTRACTURAL ORIGIN OF THE INVENTION

The United States Government has rights in this invention pursuant to Contract No. W-31-109-ENG-38, between the U.S. Department of Energy and the University of Chicago, representing Argonne National Laboratory.

BACKGROUND OF THE INVENTION

Conventional high-temperature bipolar batteries have positive and negative electrodes which are confined relative to the collectors of positive and negative current. The current collectors are electrically insulated from one another by a separator. An electrolyte is present and infused throughout (into) the electrodes and the separator. The positive and negative current collectors are commonly formed of electrically conductive sheets which also confine the electrode materials. When arranged in a series configuration, a bipolar plate caps the negative electrode, as well as attaches the positive compartment of the next cell in the bipolar stack. Full size batteries of this type are comprised of many cells grouped together in an end-to-end or face-to-face arrangement in a common battery housing and are electrically connected in series to produce higher effective voltage output. Typically, the negative electrode material is a lithium alloy, such as LiSi or LiAl and the positive electrode material is an iron sulfide, such as FeS or $FeS_2$.

Electrolytes of the prior art include mixtures of lithium chloride and potassium chloride. Such systems exhibit a relatively limited dynamic range—the ratio of alkali or alkaline earth metal ions over which the electrolyte will remain liquid—at a specific temperature. A limited dynamic range manifests itself in electrolyte solidification in the electrodes as the concentration of positive ions changes during cell operation. As a result, the larger the dynamic range, the more useful the electrolyte, inasmuch as solidification reduces electrode efficiency.

The search for an effective, efficient electrolyte system has been an on-going concern of the prior art. One approach, which has been used with some success, involves the use of a eutectic mixture of lithium chloride, lithium bromide, and potassium bromide, as disclosed in U.S. Pat. No. 4,764,437 issued Aug. 16, 1988, the entire disclosure of which is incorporated herein by reference. Therein a low melting electrolyte having an expanded dynamic range is described as part of a cell demonstrating overall improved discharge capacity. It was found that using the eutectic in combination with a dense $FeS_2$ electrode provides lower effective operating temperatures and eliminates the capacity-loss problem typically associated with lithium alloy cells using a lithium chloride/potassium chloride electrolyte. With lower operating temperatures and an expanded electrolyte liquidus range, electrolyte solidification in the electrodes is reduced at high current densities.

However, the prior art is associated with several problems, most of which are related to the separator apparatus used in conjunction with the electrolytic material. Conventional separators are formed from fibrous boron nitride or, alteratively, pressed magnesium oxide or aluminum nitride powder. For example, an electrolyte/separator of the prior art is typically fabricated by introducing molten electrolyte into porous magnesium oxide, followed by a high-pressure, cold-pressing operation. The deficiencies of such separators are well known: the separators are necessarily restricted to relatively-thick designs and configurations, high-pressure fabrication is relatively costly and introduces mechanical stress upon ejection, and capacity utilization is reduced at higher current densities.

Accordingly, it is an object of the invention to provide an improved separator for bipolar batteries.

It is an object of the invention to provide a separator which is effectively distributed in the electrolyte, by melting both the electrolyte phase and powder-separator phase, to form a molten two-phase mixture at battery operating temperatures.

It is another object of this invention to provide a quaternary salt system, in which a binary salt is generally immiscible with a eutectic mixture of three electrolytic binary salts.

Another object of this invention is to provide a separator for use in conjunction with a eutectic electrolytic mixture for improved performance at higher current densities, as compared to separators and related apparatus of the prior art.

It is another object of this invention to provide an alternative electrolyte/separator fabrication, one involving melting both electrolyte and separator phases for casting into molds, such that separators may be designed and configured for a variety of electrochemical applications.

A further object of this invention is to provide a binary separator salt having low solubility in a eutectic electrolytic mixture, such that battery operating temperatures will sinter the salt in sire, physically strengthening the separator through operation.

Another object of this invention is to provide an electrolyte/separator such that a cell may exhibit improved performance, greater capacity, and maximum utilization, even at low current densities.

Another object of this invention is to provide a new electrolyte/separator such that batteries may be designed with thicker electrodes, reducing cost and increasing specific energy.

Another object of this invention is to increase the fraction of molten electrolyte in the separator to increase ionic conductivity.

Another object of this invention is to increase lithium ion activity in the electrolyte to enhance electrode performance, but maintain low battery operating temperatures and electrolyte liquidus.

Another object of this invention is to maintain a stable $Li^+/K^+$ ratio at high current densities to enhance cell performance.

These and other important objects of the invention will be apparent from the following description.

BRIEF DESCRIPTION OF THE DRAWINGS

FIG. 3A is a cyclic voltamogram of an $FeS_2$ electrode in LiCl-LiBr-KBr at 415° C.; $Li_3Fe_2S_4 \rightarrow 2FeS_2$ (1.810) and $2FeS_2 \rightarrow Li_3Fe_2S_4$ (1.725), ΔLEP=85 mV; and FIG. 3B is a cyclic voltamogram of an FeS$_2$ electrode in LiCl-LiBr-KBr with 15 wt % LiF as solid dispersion, Li$_3$Fe$_2$S$_4$→2FeS$_2$ (1.780) and 2FeS$_2$→Li$_3$Fe$_2$S$_4$ (1.740), ΔLEP=40 mV.

DETAILED DESCRIPTION OF THE INVENTION

Figure 1:
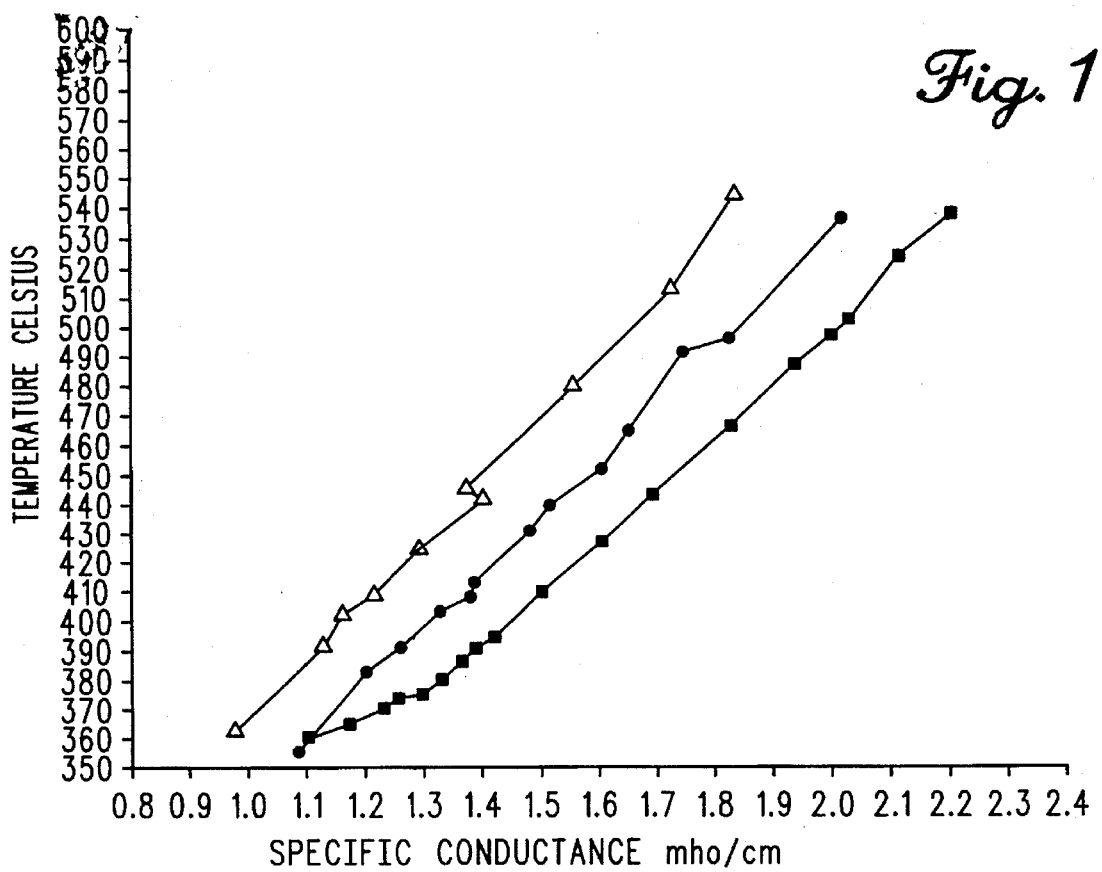
FIG. 1 compares the conductivity of various modified eutectic compositions ■=LiCl 34%, LiBr 32.5%, KBr 33.5%; ∆=LiCl 25%, LiBr 37%, KBr 38%; ●=LiF 12%, LiCl 22%, LiBr 32.5%, KBr 33.5%.

This invention is an improved separator for molten-electrolyte cells. It overcomes certain well-known problems and deficiencies, including those outlined above. The separator is effectively dispersed, on the molecular level, in the electrolyte to form a molten phase-separated mixture. Advantages relating to increased cell capacity and efficiency are available over separators of the prior art.

In part, the present invention is an apparatus for electrically insulating oppositely-charged electrochemical cell electrodes, comprised of a solid salt dispersed in a molten electrolyte composition. The electrolyte composition is a eutectic mixture of salts including alkali and alkaline earth metal cations—more particularly and in preferred embodiments a eutectic mixture of lithium chloride, lithium bromide, and potassium bromide in a molar ratio of 25:38:37.

Likewise, in preferred embodiments, the solid salt is lithium fluoride, present at about 15–60 weight percent. In other embodiments, the solid salt may be calcium carbonate, potassium calcium carbonate or sodium calcium carbonate, dispersed within a eutectic mixture of lithium carbonate, sodium carbonate, and potassium carbonate. Regardless, the cell within which such a separator is utilized may be one of several well-known electrochemical systems, including alkali metal/sulfide, sodium/metal chloride, and molten carbonate fuel cells.

In part, the present invention is an electrolyte/separator system for use in conjunction with an electrochemical cell having negative and positive electrodes in conductive relationships to one another and the separator. The separator is comprised of a 15–60 weight percent solid lithium fluoride salt dispersed within a eutectic mixture of lithium chloride, lithium bromide, and potassium bromide. As such, the negative electrode is preferably a lithium alloy and a lithium fluoride pressed ring may be used to separate conductive current collectors, irrespective of whether the electrodes are arranged and configured in a series circuit.

The present invention also includes a method for preparing an electrolyte/separator, including melting an electrolyte compositions with a solid salt, pouring the molten mixture into a mold, and cooling to provide a suitable-shaped separator. Again, a preferred electrolyte is a eutectic mixture of lithium chloride, lithium bromide, and potassium bromide, while the solid salt is lithium fluoride. The method further includes sintering the lithium fluoride solid at cell operating temperatures to physically strengthen the separator apparatus.

As is evident from the descriptions which follow, the invention includes a novel quaternary system of binary salts, three forming a ternary mixture, and at least one of which includes an electrochemically-active ion; that is, an ion inducing electrical conductivity, such as, but not limited to Li$^+$ and CO$_3^{-2}$. The fourth salt of the system is substantially immiscible in the ternary mixture and contributes electrically conducting ions to the system. At the melting point of the ternary mixture, the fourth binary salt is a discreet solid dispersed throughout the mixture. Phase separation is observed at low weight percent levels and over a broad range, as is evident where lithim fluoride is utilized as the solid salt (about 1–60 weight percent).

As described above, one embodiment of the quaternary system of the present invention is a solid separator salt effectively distributed within a molten electrolyte, to form a molten two-phase mixture under typical fabrication conditions. Cooling results in a molecular-level dispersion of the solid salt within the electrolyte which is maintained at cell operating temperatures. The preferred lithium fluoride salt with a lithium chloride-lithium bromide-potassium bromide electrolyte, when employed within the context of an electrochemical cell, shows improved performance at higher current densities, as compared to separators of the prior art, and in particular, against those fabricated from porous magnesium oxide.

In accordance with this invention and as described below, other solid salt/separator materials are available for use with a given electrolytic composition. The separator material chosen is substantially immiscible with the electrolyte and has a melting point above that of the electrolyte, but below that which would vaporize the electrolyte (about 900° C. for a lithium chloride, lithium bromide, potassium bromide mixture).

Comparisons of electrolyte conductivity of modified lithium chloride-lithium bromide-potassium bromide eutectic mixtures suggested enhanced performance of lithium-alloy/metal disulfide electrochemical cells. As shown graphically in FIG. 1, the addition of lithium fluoride did not improve conductivity proportionally to that of lithium chloride addition. Furthermore, it was observed that lithium fluoride has only a limited solubility in the eutectic which does not increase with temperature. The results suggested a route for providing a localized lithium ion concentration (through use of solid lithium fluoride) approaching unit activity—and an electrolyte with a liquidus of less than or equal to 400° C. In the context of an electrochemical cell, the electrodes contain a free dispersion of lithium fluoride powder (approximately 1–20 weight percent), acting as a reservoir of lithium ions. The cell is operated at less than or about 425° C., owing to the relatively low liquidus temperature of the eutectic electrolyte mixture.

As observed, further lithium fluoride addition to the eutectic does not change conductivity. Therefore, a reservoir of lithium ions would be expected to take up less volume within a cell electrode than otherwise thought possible. The reservoir or source of lithium ions is especially desirable for electrolytes containing lithium and other cations, where charge transfer (current flow) is due to localized compositional changes (i.e. changes in the lithium/potassium ion ratio). An additional source of lithium ions reduces such compositional change and invariably leads to an enhanced cell performance.

X-ray defraction (XRD) analysis was performed to identify and characterize the immiscible salt component of the present invention. A physical mixture of a lithium chloride-lithium bromide-potassium bromide eutectic and lithium fluoride (50:50 weight percent) was analyzed and compared to the identical system after processing at 425° C. for two hours under argon. (The eutectic has a melting point of 320° C.). Diffraction comparison shows the lithium fluoride present as discreet, unaltered solid phase within the molten eutectic mixture, supporting the formation of a phase-separated system.

Lithium fluoride is obviously highly wetted by the molten salt eutectic. This characteristic can be employed to enable electrolyte-starved (or limited-electrolyte) cell operation to retain a greater fraction of molten salt before becoming fluid. At concentrations described herein, high-surfaced lithium fluoride acts, therefore, as a molten salt sponge within the electrode. This characteristic is especially useful in high pulse-power applications, where the wetting/volume fractions of molten metal electrolytes for the separator are first-order.

Figure 2:
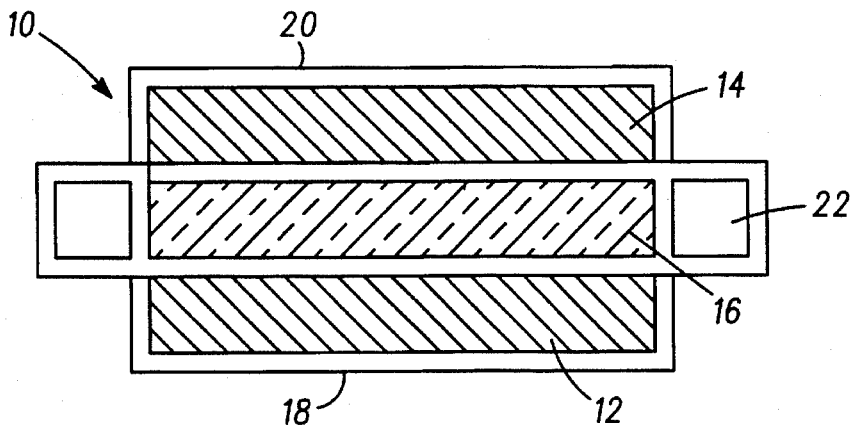
FIG. 2 schematically shows, in cross-sectional view, an electrochemical cell in accordance with this invention.

The XRD data both suggests and supports formation of a stable, porous separator using a salt such as lithium fluoride as a solid separator in an electrolyte to physically separate and insulate positive and negative electrodes. FIG. 2 is a cross-sectional view of an electrochemical cell, schematically illustrating the use of a molten salt electrolyte/separator, in accordance with the present invention. Cell 10 includes negative electrode 12 and positive electrode 14, separated by electrolyte/separator 16. The negative and positive electrodes are confined by negative and positive current collectors 18 and 20, respectively. Pressed ring 22 separates the current collectors.

It will be understood that one skilled in the art can construct electrochemical cell 10 with a variety of electrodes and collector materials. However, in preferred embodiments, the cell 10 has alkali-metal conductivity and is constructed as described more fully in U.S. Pat. No. 5,162, 172, issued Nov. 10, 1992, using materials described both therein and in U.S. Pat. No. 5,194,298, particularly Tables I and II thereof and as described in col. 2–7, issued Mar. 16, 1993, both of which are incorporated by reference in their entirety. In highly preferred embodiments—an electrochemical cell or a bipolar battery having a plurality of such cells—negative electrode 12 is a lithium alloy, generally LiAl or LiSi, and positive electrode 14 is an iron sulfide, $FeS_2$ or FeS. Likewise, in accordance with this invention, the preferred electrolyte is a lithium chloride-lithium bromide-potassium bromide eutectic mixture, within which a phase-separated lithium fluoride separator material is dispersed.

XRD data also supports the use of a lithium fluoride dispersion within an electrode to alter electrochemical reaction. Functioning electrochemically and within the content of a cell, the lithim fluoride creates locally-high lithium ion concentrations (approaching unit activity compared to about 0.62 $Li^+$ activity in a 25:38:37 lithium chloride-lithium bromide-potassium bromide melt), improving electrode kinetics without significantly altering the properties of the molten electrolyte. For instance, an $FeS_2$ electrode can still be operated at 400°–425° C., without thermal decomposition.

Figure 3A:
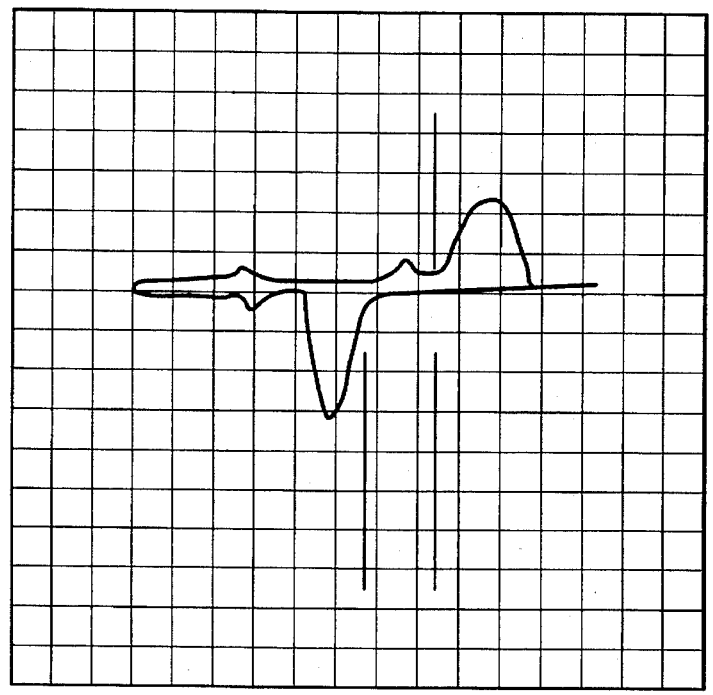
FIGS. 3A and 3B demonstrate the improved electrochemistry of a iron disulfide electrode through use of a separator in accordance with the present invention.
Figure 3B:
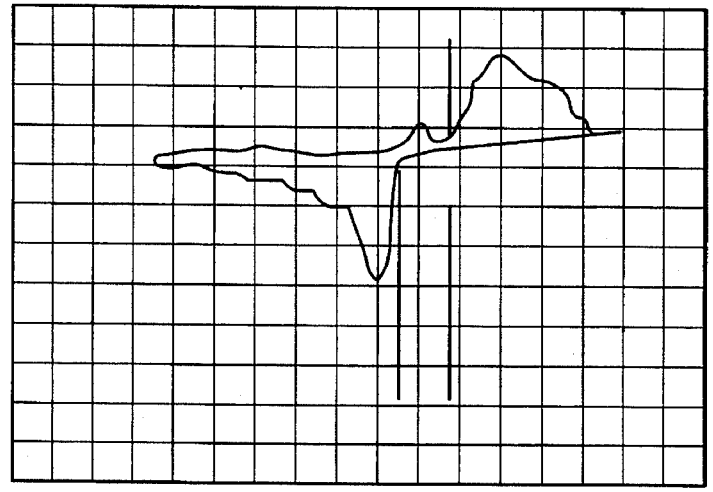

As shown in FIGS. 3A and 3B, cyclic voltametry was used to evaluate the reversibility of the pertinent electrochemical reactions and demonstrate the improved electrochemistry of an iron sulfide electrode through use of a lithium fluoride dispersion within the electrode. Separation of charge and discharge capacity peaks for the reaction: $2FeS_2+3Li^++3e^-\rightarrow Li_3Fe_2S_4$ is consistent with complicated electrode/reaction kinetics. Peak separation is measured by the difference in millivolts (mV) between leading edge potentials (LEP) of the capacity peaks. Reduction in LEP difference (ΔLEP) is indicative of improved electrochemical kinetics. With reference to FIG. 3A, a ΔLEP of 85 mV is measured for a $FeS_2$ electrode under the conditions shown.

By comparison and as illustrated in FIG. 3B, a phase-separated lithium fluoride dispersion under similar conditions provides a ΔLEP of only 40 mV—demonstrating improved $FeS_2$ electrode reversibility.

The 45 mV reduction observed in ΔLEP is much greater than that attributable to temperature increase alone—typically about 10 mV per 25° C. Rather, the reduction is more appropriately the result of increased lithium ion activity in the molten electrolyte and improved reaction kinetics. The sulfide electrode performs in a manner more consistent with unit lithium ion activity, as compared to an activity of 0.62 as is available through lithium chloride-lithium bromide-potassium bromide eutectic (25:37:38 mole percent).

Figure 4:
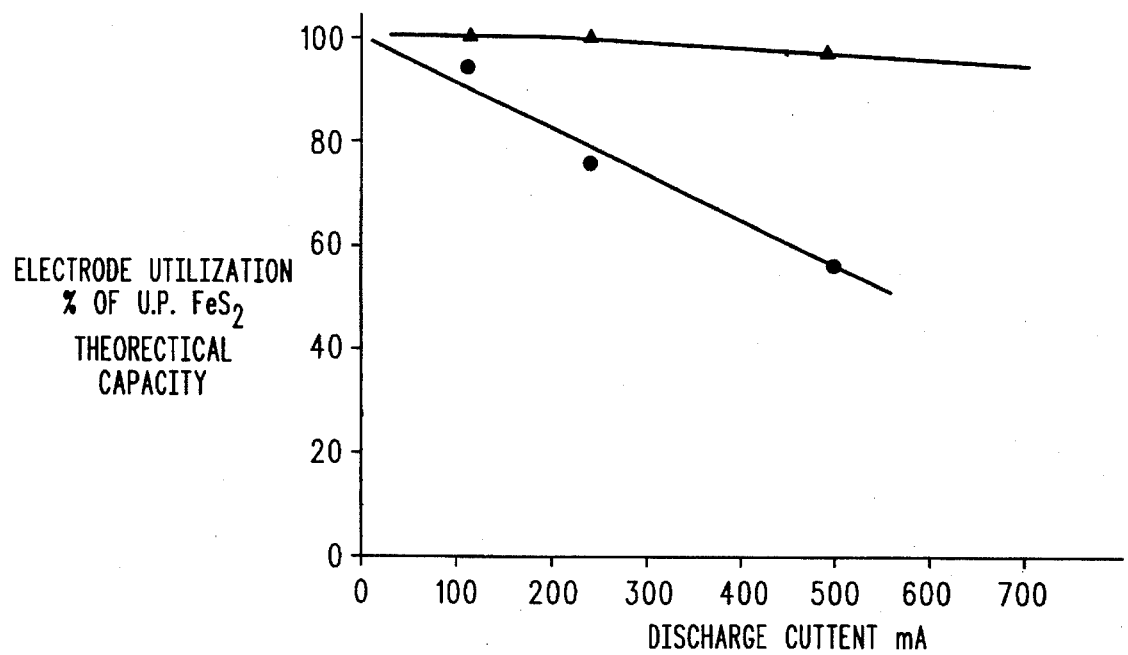
FIG. 4 shows improved cell performance using a lithium fluoride separator, in accordance with the present invention, the effect of LiF-powder separator (▲) to improve cell performance over that of MgO-powder separator (●), in LiCl-LiBr-KBr at 415° C.; two pellet cells of 0.625 mAh, U.P. FeS$_2$ capacity.

To demonstrate improved cell performance, a separator was prepared using lithium fluoride (25 weight percent) and a lithium chloride-lithium bromide-potassium bromide eutectic mixture (75 weight percent). The powders were mixed and fused at 500° C. (The mixture did not puddle, but produced a wet sand-pile appearance.) The fused mixture was then reduced to powder and pressed into a one inch diameter pellet. A cell was assembled with a lithium fluoride powder pressed ting to separate two metal electrode cups used as current-collectors, and compared in operation to a similar cell employing a 25 weight percent magnesium oxide separator. Both cells were operated at 415° C. The cell with lithium fluoride separator exhibited almost 100% utilization at 500 mA (100 mA/cm$^2$). Refer to FIG. 4 which shows less than 60% utilization observed through use of a magnesium oxide-powder separator.

Improved electrode utilization at higher current densities allows for the battery designs incorporating thicker electrodes, which contribute to lower cost and higher specific energy. In addition, the ability to obtain a phase-separated molecular dispersion of the type described herein also leads to greater volume fraction of molten salt in the separator layer and increased ion conductivity. As such, particle retention is enhanced.

The separators of this invention may be formed through various well-known casting techniques; e.g. melting both electrolyte and separator phase salts. In contrast to the flat plate or disc-type separators of the prior art, those described herein may be fabricated for use with a multiplate cell and can be poured-cast-into place using any suitable mold. In the context of bipolar cell, design and cell performance can be enhanced through use of a watch glass-shaped separator. Liquid electrode cell systems (e.g. lithium, sodium, sulfur, metal chlorides) are more practical as a consequence of the ability to use a castable separator.

Separator durability is also enhanced through use of this invention. Without adhering to any one theory, it is believed that under typical cell operating temperatures and given the limited solubility of lithium fluoride in the electrolyte, lithium fluoride solid is sintered in situ, such that the separator is physically strengthened during operation.

While the principals of this invention have been described in connection with specific embodiments, it should be understood clearly that these descriptions are made only by way of example and are not intended to limit the scope of the invention. Modifications may be made to the invention without deviating from the broader features described herein. For example, calcium carbonate and related alkaline metal salts may function as a separator when used in conjunction with a molten carbonate electrolyte (i.e., lithium carbonate-sodium carbonate-potassium carbonate) in a molten carbonate fuel cell. The calcium-based carbonates have a melting point higher than 800° C. while a molten carbonate cell is operated at 600°–700° C. As with a lithium fluoride separator, the carbonate electrolyte/separator can be cast from a molten mixture to provide a solid dispersion of calcium carbonate compounds which act as a solid absorbent for molten carbonates at typical operating temperatures. The inventive electrolyte separators can also be modified by partial substitution of solid magnesium oxide, aluminum nitride, calcium oxide, or the like with lithium fluoride and/or calcium carbonate, as the solid salt dispersed in the molten electrolyte composition, maintaining a two-phase system during cell operation. Without limiting the invention, the substitution is on the order of about 1–20 weight percent.

Likewise, reciprocal-ternary molten salts appear to be advantageous for the formation of a phase-separated mixture of a solid salt, which is immiscible in a molten salt that shares an ion with the solid salt-phase. In particular, reciprocal-ternary systems displaying immiscibility gaps lend themselves to the preparation of phase-separated electrolyte/separator systems for an electrochemical cell, as described herein. The dispersed solid phase forms homogeneously from a total liquid/liquid melt; as a result there is no need for nucleation.

Other advantages and features of the invention will become apparent from the claims hereinafter, with the scope of the claims determined by the reasonable equivalents as understood by those skilled in the art.

What is claimed is:

1. An apparatus for electrically insulating electrochemical cell electrodes with a quaternary system of binary salts, comprising:
    a molten ternary mixture of binary salts, said mixture forming an electrolyte composition; and
    a fourth binary salt dispersed in said composition, said fourth salt a solid within said composition such that a two-phase system is maintained during cell operation.

2. The apparatus as defined in claim 1 wherein said electrolyte composition is a eutectic mixture of salts, said salts having ions selected from the group consisting of alkali and alkaline earth metals cations.

3. The apparatus as defined in claim 2 wherein said mixture comprises lithium chloride, lithium bromide, and potassium bromide.

4. The apparatus as defined in claim 3 wherein the molar ratio of lithium chloride to lithium bromide to potassium bromide is about 25:38:37.

5. The apparatus as defined in claim 3 wherein said solid salt is lithium fluoride present at about 15–60 weight percent.

6. The apparatus as defined in claim 2 wherein said mixture comprises lithium carbonate, sodium carbonate, and potassium carbonate.

7. The apparatus as defined in claim 6 wherein the solid salt is selected from the group consisting of calcium carbonate, potassium calcium carbonate, and sodium calcium carbonate.

8. The apparatus as defined in claim 1 wherein the cell is selected from the group of electrochemical systems consisting of molten alkali metal/sulfide, sodium/metal chloride, and carbonate fuel cells.

9. The apparatus as defined in claim 8 wherein the cell comprises a lithium/sulfide electrochemical system.

10. The apparatus as defined in claim 9 wherein:
    said electrolyte composition is a eutectic mixture of lithium chloride, lithium bromide, and potassium bromide; and
    said solid salt is lithium fluoride.

11. An electrochemical cell having alkali-metal conductivity, comprising:
    a conductive member selected from the group consisting of a metallic material, a ceramic material, and combinations thereof;
    a negative electrode selected from the group consisting of alkali metals, alkaline earth metals, and alloys thereof, said electrode in a substantially conductive relationship to said member;
    a separator including a molten ternary mixture of binary salts forming an electrolyte, said salts selected from the group consisting of alkali and alkaline earth metal salts, and a fourth electrically-insulating binary salt dispersed as a solid in said mixture, said separator in a substantially conductive relationship to said negative electrode; and
    a positive electrode selected from the group consisting of metal oxides, sulfides, nitrides, and carbides intercalated with alkali metal ions, said electrode in a substantially conductive relationship to said separator.

12. The cell as defined in claim 11 wherein said alkali metal is lithium, and said negative electrode is a lithium alloy.

13. The cell as defined in claim 11 wherein said electrolyte is a lithium chloride, lithium bromide, and potassium bromide eutectic mixture; and said solid salt is lithium fluoride present at about 15–60 weight percent in said separator and at about 1–20 weight percent in said positive electrode.

14. The cell as defined in claim 11 further including a containment means to separate said conductive member from the conductive member of a second cell, said means comprising a lithium fluoride ring.

15. The cell as defined in claim 11 wherein said member is a bipolar plate in a substantially conductive relationship to a second positive electrode arranged and configured in a series circuit with said negative electrode.

* * * * *